US007112756B2

(12) United States Patent
Hanson

(10) Patent No.: US 7,112,756 B2
(45) Date of Patent: Sep. 26, 2006

(54) SINGLE PASS SEQUENCER

(75) Inventor: Bruce H. Hanson, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 317 days.

(21) Appl. No.: 10/265,568

(22) Filed: Oct. 8, 2002

(65) Prior Publication Data

US 2004/0065595 A1 Apr. 8, 2004

(51) Int. Cl.
*B07C 5/01* (2006.01)
*G06K 9/01* (2006.01)

(52) U.S. Cl. ....................... 209/584; 209/900; 700/225; 700/226; 700/223

(58) Field of Classification Search ................. 209/584, 209/900; 700/225, 224, 223, 226
See application file for complete search history.

(56) References Cited

U.S. PATENT DOCUMENTS 5,388,703 A 2/1995 Schönenberger et al.
5,794,534 A 8/1998 Enderlein et al.
5,904,255 A 5/1999 Hidding et al.
6,316,741 B1 11/2001 Fitzgibbons et al.
6,555,776 B1 * 4/2003 Roth et al. .................. 209/584
2002/0139726 A1 * 10/2002 Roth et al.

* cited by examiner

*Primary Examiner*—Donald P. Walsh
*Assistant Examiner*—Jonathan R Miller
(74) *Attorney, Agent, or Firm*—Greenblum & Bernstein, P.L.C.

(57) ABSTRACT

A single pass sequencer having a transport system for transporting the mail pieces and a character recognition system proximate to the transport system for reading destination information associated with the mail pieces. The system includes a first carriage system and a second carriage system with a a plurality of holders slidable between the first carriage system and the second carriage system. Each of the plurality of holders holding a mail piece of the mail pieces received from the transport system. A sorting device stores information from the mail pieces and assigns a code to: (i) the mail pieces based on the destination information, (ii) the plurality of holders on the first carriage based on an initial sequence of each of the plurality of holders on the first carriage, and (iii) a position on the second carriage which corresponds to the initial sequence and a destination sequence of the mail pieces. The sorting device instructs movement of the plurality of holders from the first carriage to the second carriage based on the code assigned to the mail pieces, the plurality of holders on the first carriage and the position on the second carriage such that when the mail pieces are moved to the second carriage they are in sequential order of delivery destination.

22 Claims, 3 Drawing Sheets

SINGLE PASS SEQUENCER

BACKGROUND OF THE INVENTION

1. Field of the Invention

The present invention generally relates to a single pass sequencer and in particular to a system for sequencing objects such as mail pieces in order of delivery using a single pass system.

2. Background Description

The delivery of mail such as catalogs, products, advertisements and a host of other articles have increased exponentially over the years. These mail pieces are known to be critical to commerce and the underlying economy. It is thus critical to commerce and the underlying economy to provide efficient delivery of such mail in both a cost effective and time efficient manner. This includes, for example, arranging randomly deposited mail pieces into a sequential delivery order for delivery to a destination point. By sorting the mail in a sequential order based on destination point, the delivery of mail and other articles can be provided in an orderly and effective manner.

In current sorting processes, optical character recognition systems may be used to capture delivery destination information. A host of feeders and other complex handling systems are then used to transport the mail to a host of bins or containers for sorting and future delivery. To this end, central processing facilities, i.e., United States Postal Service centers, have employed a high degree of automation using bar code readers and/or character recognition to perform basic sorting of articles to be transported to defined geographic regions or to local offices within those regions. It is also known to manually sort mail pieces, but this process is very labor intensive, time consuming and costly.

As to known automated sorting processes, currently, for example, a two pass algorithm process is used as one method for sorting mail based on delivery destination. In this known process, a multiple pass process of each piece of mail is provided for sorting the mail; that is, the mail pieces, for future delivery, are fed through a feeder twice for sorting purposes. In general, the two pass algorithm method requires a first pass for addresses to be read by an optical character reader and assigned a label or destination code. Once the mail pieces are assigned a label or destination code, they are then fed to bins based on one of the numbers of the destination code. The mail pieces are then fed through the feeder a second time, scanned, and sorted based on the second number of the destination code. It is the use of the second number which completes the basis for sorting the mail pieces based on delivery or destination order.

The two pass algorithm method may present some shortcomings. For example, the mail pieces are fed through the feeder twice, which may increase the damage to the mail pieces. Second, known optical recognition systems typically have a reliability of approximately 70%; however, by having to read the mail pieces twice, the rate is multiplied by itself dramatically reducing the read rate and thus requiring more manual operations. That is, the read rate is decreased and an operator may have to manually read the destination codes and manually sort the mail when the scanner is unable to accurately read the destination code, address or other information associated with the mail pieces two consecutive times. Additionally, bar code labeling and additional sorting steps involves additional processing time and sorting machine overhead as well as additional operator involvement. This all leads to added costs and processing times.

It is also known that by using the two pass algorithm method as well as other processing methods, the containers and bins may not be efficiently utilized, thus wasting valuable space. By way of illustrative example, a first bin may not be entirely filled while other bins may be over-filled. In this scenario, the mail pieces are not uniformly stacked within the bins, wasting valuable space, causing spillage or an array of other processing difficulties.

The present invention is designed to overcome one or more of the above shortcomings.

SUMMARY OF THE INVENTION

In a first aspect of the present invention, a system is provided for sorting mail pieces based on destination point. The system includes a feeder transport system for transporting the mail pieces and a a reader proximate to the feeder transport system for reading destination information associated with the mail pieces. A cell movement mechanism is provided downstream from the feeder transport system. The cell movement mechanism has a first carriage system and a second carriage system and a plurality of holders slidably positionable between the first carriage system and the second carriage system. The plurality of holders each capture and hold a mail piece of the mail pieces. A sorting device stores the destination information and assigns a code to each of the mail pieces and the plurality of holders based on the destination information of the mail pieces and sorting criteria of the plurality of holders to sort the mail pieces in sequential order of delivery destination.

In a second aspect of the present invention, the system for sorting mail pieces based on destination point includes a transport system for transporting the mail pieces and a character recognition system for reading destination information associated with the mail pieces. A first carriage system and a second carriage system are provided. The plurality of holders slidable between the first carriage system and the second carriage system, where each of the plurality of holders holds a mail piece of the mail pieces received from the transport system. A sorting device is also provided. The sorting device assigns a code to:

1. the mail pieces based on the destination information,
2. the plurality of holders on the first carriage based on an initial sequence of each of the plurality of holders on the first carriage, and
3. a position on the second carriage which corresponds to the initial sequence and a destination sequence of the mail pieces.

The sorting device instructs movement of the plurality of holders from the first carriage to the second carriage based on the code assigned to the mail pieces, the plurality of holders on the first carriage and the position on the second carriage. When the mail pieces are moved to the second carriage they are in sequential order of delivery destination.

In another aspect of the present invention a system is provided for sorting mail pieces having a transport system, a character recognition system and a carriage system. A plurality of holders slide between tracks on the carriage system, where each of the plurality of holders holds a mail piece received from the transport system. A sorting device communicating with the character recognition system stores information associated with the mail pieces and assigning a code to:

1. the mail pieces based on the destination information,
2. the plurality of holders, and
3. a position on one track of the carriage system corresponding to an initial sequence of the plurality of holders and a destination sequence of the mail pieces.

The sorting device instructs movement of the plurality of holders between the tracks based on the destination information, the initial sequence and the position on the one track such that when the mail pieces are moved to the one track so they are in sequential order of delivery destination.

In yet another aspect of the present invention, the system is used for sorting objects such as, for example, parts or products or the like. The system includes a feeder transport system for transporting the objects and a reader proximate to the feeder transport system for reading destination information associated with the objects. A cell movement mechanism is downstream from the feeder transport system. The cell movement mechanism has a first carriage system and a second carriage system and a plurality of holders slidably positionable between the first carriage system and the second carriage system. The plurality of holders each capture and holding an object of the objects. A sorting device for storing the destination information and assigning a code to each of the objects and the plurality of holders based on the destination information of the objects and sorting criteria of the plurality of holders to sort the objects is also provided.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A DETAILED EMBODIMENT OF THE INVENTION

The present invention provides a flexible system for sorting objects such as, for example, flats, mail pieces and other products or parts (generally referred to as flats or mail pieces). In the system of the present invention, only a single feed or pass is required through a feeder system to order and sequence the flats for future delivery. The system of the present invention may also be implemented in warehouse management systems. By way of example, the system of the present invention may sequence products or parts for assembly, distribution, (internally or externally) or storage.

The system of the present invention provides the flexibility of tracking the flats throughout the entire system while using many known off-the-shelf systems. This reduces manufacturing and delivery costs while still maintaining comparatively superior sorting and delivery results. The system of the present invention also minimizes damage to flats, provides a single drop point, as well as increases the overall efficiency of the off-the-shelf components such as, for example, an optical character recognition system. The present invention is further designed to package the flats and to ensure that "tubs" or other transport containers are efficiently utilized by ensuring that the transport containers are evenly filled to a maximum or near maximum level. The present invention may be utilized in any known processing facility ranging from, for example, a postal facility to a host of other illustrative facilities.

EMBODIMENTS OF THE PRESENT INVENTION

Figure 1:
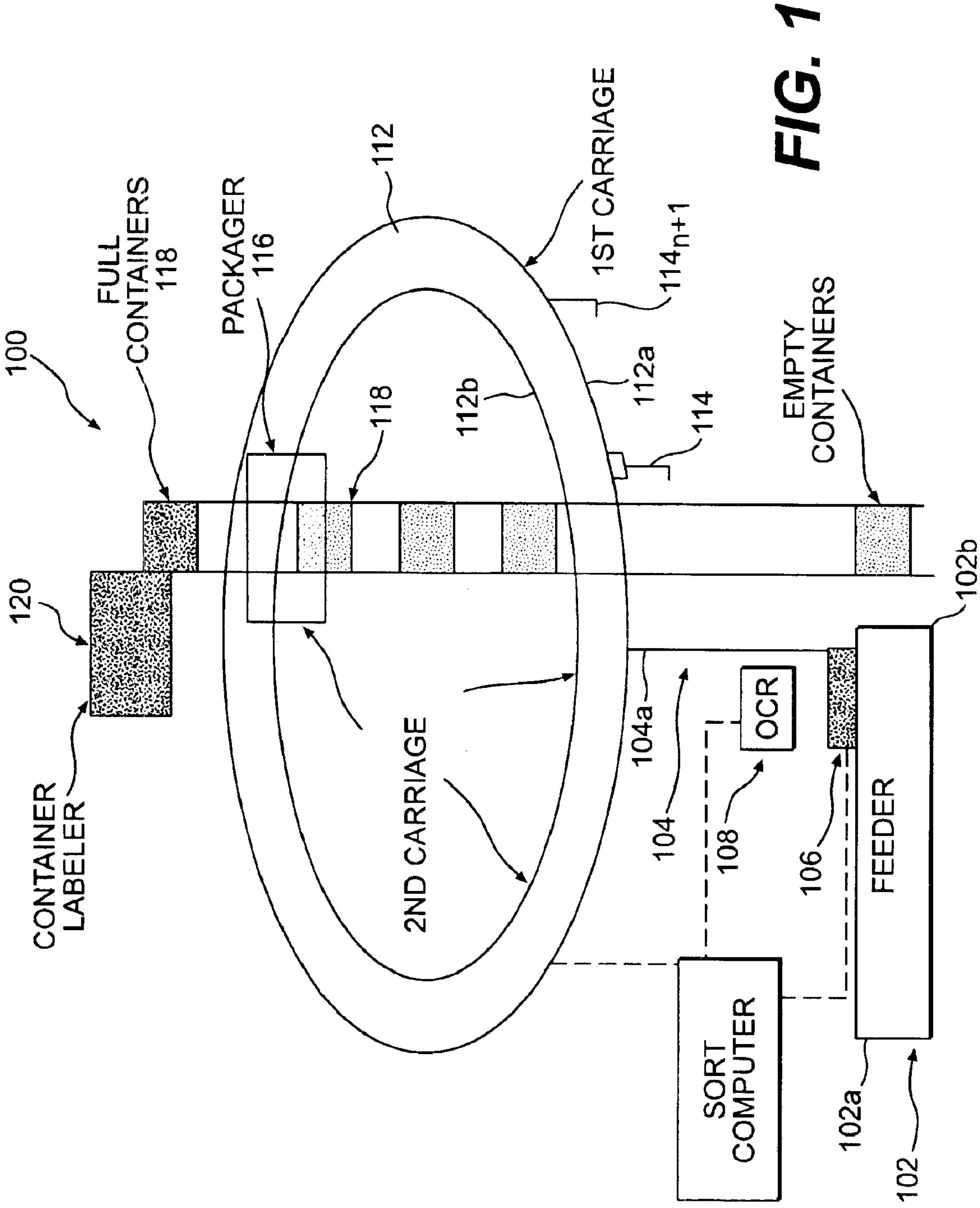
FIG. 1 is an overview of the single pass system of the present invention.

FIG. 1 depicts an overview of the present system. The sorting mechanism of the present invention is generally depicted as reference numeral 100. The system 100 includes a feeder 102 positioned at a beginning of the process. The feeder 102 may be any known feeder 102 that is capable of transporting flats from a first end 102*a* to a second, remote end 102*b*. In embodiments, the feeder 102 is capable of feeding the stream of flats at a rate of approximately 10,000 per hour. Of course, those of skill in the art should recognize that other feed rates, depending on the application, might equally be used with the present invention. A transport system or feed track 104 is positioned downstream from the feeder 102, and preferably at an approximate 90° angle therefrom. This angle minimizes the use of valuable flooring space within the processing facility. The feed track 104 may also be at other angles or orientations (e.g. 0° to 180°), depending on the flooring configuration of the processing facility.

A flat thickness device 106 and a scanning device 108 such as, for example, an optical character recognition device (OCR) or the like is provided adjacent the feed track 104. In embodiments, the flat thickness device 106 measures the thickness of each flat as it passes through the system, and the OCR 108 reads the address or other delivery information which is located on the flat. The flat thickness device 106 may be any known measuring device such as a shaft encoder, for example. The flat thickness device 106 and the OCR 108 communicate with a sorting computer 110. The communication may be provided via an Ethernet, Local Area Network, Wide Area Network, Intranet, Internet or the like. The flat thickness device 106 and the OCR 108 provide the thickness and address information to the sort computer 110, at which time the sort computer 110 assigns a virtual code to the flat for delivery and sorting purposes. This is provided via a look-up table or other known method.

Still referring to FIG. 1, at a remote end 104*a* of the feed transport 104 is a cell movement mechanism 112 of the present invention. The cell movement mechanism 112 includes a first carriage or track 112*a* and a second adjacent carriage or track 112*b*. The cell movement mechanism 112 may be any shape such as an oval shape shown in FIG. 1. It should be recognized that other shapes such as circular, serpentine or other shapes that are designed for certain flooring spaces are also contemplated for use by the present invention. In one embodiment, the overall track length may be 167 feet, which translates into a 53 feet diameter or approximately a 45 feet square switch back arrangement. Multiple systems may also be nestable; namely, the system of the present invention may be stacked vertically to more efficiently utilize the flooring space of the processing facility.

Figure 2:
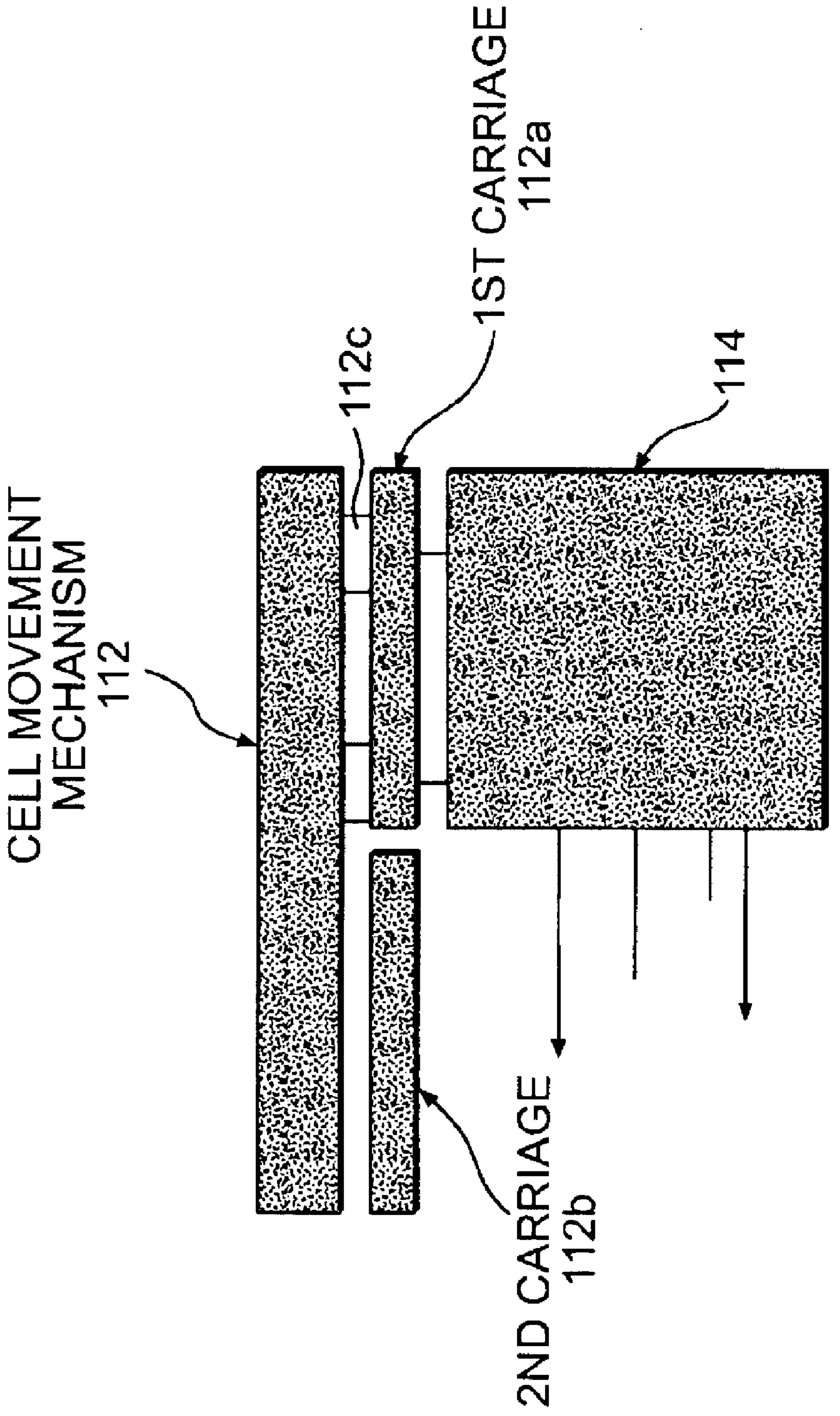
FIG. 2 is a cut away view of a carriage system used with the present invention.

In embodiments, a plurality of holders 114, $\mathbf{114}_{n+1}$ extend downward from the first carriage 112*a* or the second carriage 112*b*, depending on the particular stage of the process. The plurality of holders 114, initially extending from the first carriage 112*a*, are each assigned a numerical designation corresponding to the order of the holders 114 on the first carriage 112*a*. In one embodiment of the present invention, any number of holders 114 may extend from the first carriage 112*a* and the second carriage 112*b*. But, in one preferred embodiment, approximately 1000 holders 114 extend downward therefrom. The holders 114 are designed to (i) capture and hold the flats as they are conveyed from the feed transport 104, (ii) move about the first carriage 112*a* and the second carriage 112*b*, as well as (iii) move between the first carriage 112*a* and the second carriage 112*b*. The movement between the first carriage 112*a* and the second carriage 112*b* is provided via a sliding actuator mechanism (FIG. 2). The sort computer 110 tracks each holder in addition to the flats loaded therein, and assigns codes to the holders and positions of the holders (as discussed below). In this manner, the sort computer 110 is capable of accurately following each flat throughout the system for future sorting.

FIG. 1 further shows an optional packager 116 at a certain predetermined position with respect to the cell movement mechanism 112, and preferably aligned with the second carriage 112*b*. The packager 116 is designed to package the flats as they are unloaded from the holders 114 extending from the second carriage 112*b*. The packager 116 then transports the flats to containers 118 that are provided with a label at container labeler 120. In embodiments and due to the tracking of the thickness of each flat, the system of the present invention is capable of determining the height of the flats in each container 118 thus ensuring maximum use of each container.

FIG. 2 shows a cut away view of the cell movement mechanism 112 of the present invention. In this view, it is shown that the holder 114 extends downward from the first carriage 112*a*. A sliding mechanism, a highly schematic representation that is shown at reference 112*c*, allows the holder 114 to move between the first carriage 112*a* and the second carriage 112*b*. The order of the holders 114 on the first carriage 112*a* are sequentially assigned a number or code by the sort computer 110; whereas, a number or code is assigned to a position on the second carriage 112*b* associated with a delivery destination of each of the flats. That is, the order of the holders 114 on the second carriage 112*b* is based on the delivery order of the flats.

OPERATION OF USE

In operation, the design of the present invention allows maximum flexibility in carriage layout and allows the sequencing of flats in a single pass. This reduces exposure to feeder caused damage and provides efficient, timely delivery point packaging operations. The flexibility of the system also allows for a reduced footprint thus reducing the use of valuable flooring space while also being capable of controlling container fill based on flat thickness.

In a typical example used for illustrative purposes only and not to limit the scope of the present invention, 1000 pieces of flats may be accommodated with the use of the present invention based on 500 delivery points. The mail stream or flats are first fed through the automated feeder 102 at approximately 10,000 per hour. This translates into a feed operation of 0.1 hour. In the feed track 104, the flat image is acquired by the OCR 108 and decoded for its destination information (a code is assigned thereto). In addition, mail thickness information is acquired at the flat thickness device 106. The destination and thickness information is stored in the sort computer 110, preferably within a database. The flat is then injected into a holder 114 of the carriage track 112*a*. This process continues until all of the holders are filled or there are no more flats. In one example, the sort operation is three seconds per transfer thus translating into 0.83 hours for 1000 flats. The sort computer 110 also tracks placement of the flats within the holders 114. Also, each holder 114, on the first carriage 112*a*, is assigned a sequential number for sorting purposes. The sort computer 110 asks for definition of all pieces that the OCR could not decode so that this process may be performed manually during the feed process.

At the completion, the sort computer 110 establishes a sort order for each flat in the first carriage 112*a*. The second carriage 112*b* is also assigned numbers or codes corresponding to the sequential order of the final completed sort. The first carriage 112*a* is now incremented (one by one) up to a full rotation so all the assigned numbers align between the first carriage 112*a* and the second carriage 112*b*. As the numbers align during this incrementing process, each holder 114 is moved from the first carriage 112*a* to the second carriage 112*b*. All holders 114 that contain flats will be moved from the first carriage 112*a* to the second carriage 112*b* within one complete revolution of the track.

Up to now, the second carriage 112*b* has remained stationary. At this point, however, all of the flats are in sequential order for delivery on the second carriage 112*b*, being transported from the first carriage 112*a*. The second carriage 112*b* now moves the flats sequentially to the unload point that has the optional packager 116. Flats are dropped from the holder 114, in delivery order, into the packager 116 up to the amount required for a single delivery point. These flats may then be packaged and dropped into the empty tub or container 118 until the container 118 is full based on piece thickness, at which point a new empty container is indexed into place and the full container is labeled at optional labeler 120. This continues until all pieces are in the containers 118.

Figure 3:
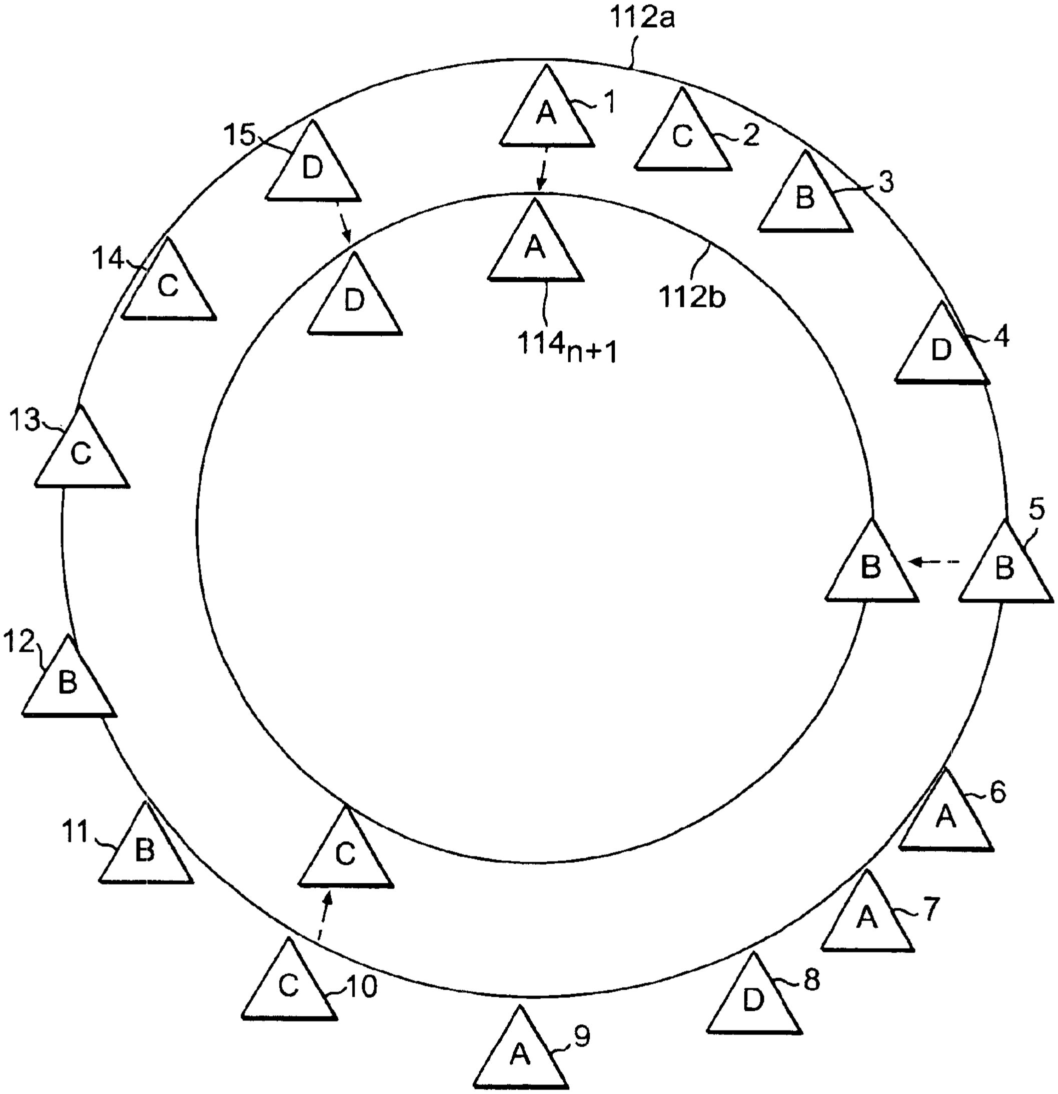
FIG. 3 shows a highly diagrammatic view of the sequencing of the mail pieces (flats, products, parts or the like) between a first carriage and a second carriage.

FIG. 3 shows a highly diagrammatic representation of the above process and is provided for illustrative purposes only. FIG. 3 shows the first and second carriages 112*a* and 112*b* with respective flats placed in holders $\mathbf{114}_{n+1}$. Initially, the holders $\mathbf{114}_{n+1}$ are positioned on the first carriage 112*a*, each being assigned a sequential number 1–15, for example. The sort computer 110 tracks the holders 1–15 and the flats (designated “A” through “D” based on delivery destination). Once all of the holders $\mathbf{114}_{n+1}$ are filled, the sort computer 110 determines whether any numbers assigned between the first and second carriage 112*a* and 112*b* are aligned. If so, then these holders are moved from the first carriage to the second carriage 112*b*. In the example of FIG. 3, the $1^{st}$, $5^{th}$, $10^{th}$ and $15^{th}$ holders of the first carriage 112*a* are initially aligned and moved to the second carriage 112*b*. The first carriage 112*a* is then rotated, and the determination of alignment and movement is then performed again. The next alignment would be at the $3^{rd}$ incremental alignment where at least the $3^{rd}$ holder (“B” destination flat) would be aligned with the sixth place in the second carriage 112*b*. At this time, the $3^{rd}$ holder would be moved to the second carriage 112*b*. This process occurs until all of the holders in the first carriage 112*a* are moved to the second carriage 112*b*, in the delivery order (i.e., all “A” though “D” delivery destinations are each grouped together and hence aligned sequentially). As now should be understood, the sort computer 110, while keeping track of all of the holders 114 and the contents therein, makes the determination of when to move the holders 114 from the first carriage 112*a* to the second carriage 112*b* for delivery sequencing. Once in the proper sequence, the second carriage 112*b* is then incrementally moved and the contents in the holders 114 are loaded into the containers, as described above.

While the invention has been described in terms of preferred embodiments, those skilled in the art will recognize that the invention can be practiced with modifications and in the spirit and scope of the appended claims.

Having thus described our invention, what we claim as new and desire by Letters Patent is as follows:

1. A system for sorting mail pieces based on destination point, comprising:

a feeder transport system for transporting the mail pieces;

a reader proximate to the feeder transport system for reading destination information associated with the mail pieces;

a cell movement mechanism downstream from the feeder transport system, the cell movement mechanism having a first carriage system and a second carriage system and a plurality of holders detachably slidably positionable between the first carriage system and the second carriage system, the plurality of holders each capturing and holding a mail piece of the mail pieces; and a device for storing the destination information and assigning a code to each of the mail pieces and the plurality of holders based on the destination information of the mail pieces and sorting criteria of the plurality of holders to sort the mail pieces in sequential order of delivery destination.

2. The system according to claim 1, wherein the device instructs each of the plurality of holders to move from the first carriage to the second carriage based on the destination information and the sorting criteria to the sequential order of delivery destination of the mail pieces on the second carriage.

3. The system according to claim 2, wherein the first carriage incrementally rotates to align each of the plurality of holders with a position on the second carriage correlating with the sequential order of the mail pieces while the second carriage remains stationary.

4. The system of claim 1, wherein the cell movement mechanism is one of an oval, circle and serpentine shape.

5. The system of claim 4, wherein the cell movement mechanism is nestable.

6. The system of claim 1, wherein the feeder transport system is a first feeder and a second feeder positioned at an angle ranging from 0° to 180° from the first feeder, the mail pieces feeding through the feeder transport system one time.

7. The system of claim 1, further comprising a packager positioned at a predetermined position with respect to the cell movement mechanism, the packager packages the mail pieces into packages as they are unloaded from each of the plurality of holders of the second carriage in the sequential order.

8. The system of claim 7, further comprising a container labeler downstream from the packager and for providing labels on each of the packages.

9. The system of claim 1, wherein:

the device assigns the code to each of the plurality of holders on the first carriage based on a sequence of the plurality of holders, the device assigns another code to each position on the second carriage associated with a placement of each of the plurality of holders based on the sequential order of the mail pieces, and the device instructs the each holder to move from the first carriage to a position on the second carriage such that each of the plurality of holders is in the sequential order of delivery destination of the mail pieces on the second carriage after the movement from the first carriage.

10. The system of claim 9, wherein the code is a sequential number based on the position of the plurality of holders on the first carriage.

11. A system for sorting mail pieces based on destination point, comprising:

a transport system for transporting the mail pieces;

a character recognition system proximate to the transport system for reading destination information associated with the mail pieces;

a first carriage system;

a second carriage system;

a plurality of holders detachable from at least the first carriage system and slidable between the first carriage system and the second carriage system, each of the plurality of holders holding a mail piece of the mail pieces received from the transport system; and a sorting device for assigning a code to:

the mail pieces based on the destination information, the plurality of holders on the first carriage based on an initial sequence of each of the plurality of holders on the first carriage, and a position on the second carriage which corresponds to the initial sequence and a destination sequence of the mail pieces, wherein the sorting device instructs movement of the plurality of holders from the first carriage to the second carriage based on the code assigned to the mail pieces, the plurality of holders on the first carriage and the position on the second carriage such that when the mail pieces are moved to the second carriage they are in sequential order of delivery destination.

12. The system of claim 11, wherein the code for the mail pieces, the plurality of holders and the position on the second carriage is a series of numbers.

13. The system of claim 11, further comprising a packager positioned at a predetermined position with respect to the second carriage, the packager packages the mail pieces as they are unloaded from each of the plurality of holders of the second carriage in the sequential order.

14. The system of claim 13, further comprising a container labeler downstream from the packager and for providing labels on each of the packages.

15. The system of claim 14, wherein:

the sorting device instructs each of the plurality of holders to move from the first carriage to the second carriage based on the code of the mail pieces and the plurality of holders and the position on the second carriage, and the first carriage incrementally rotates to align each of the plurality of holders with a position on the second carriage which correlates with the sequential order of the delivery destination of the mail pieces while the second carriage remains stationary.

16. The system of claim 11, wherein the sorting device communicates with the character recognition system and keeps track of the mail pieces in each of the plurality of holders.

17. A system for sorting mail pieces based on destination point, comprising:

a feeder transport system for transporting the mail pieces;

a reader proximate to the feeder transport system for reading destination information associated with the mail pieces;

a cell movement mechanism downstream from the feeder transport system, the cell movement mechanism having a first carriage system and a second carriage system and a plurality of holders slidably positionable between the first carriage system and the second carriage system, the plurality of holders each capturing and holding a mail piece of the mail pieces; and a device for storing the destination information and assigning a code to each of the mail pieces and the plurality of holders based on the destination information of the mail pieces and sorting criteria of the plurality of holders to sort the mail pieces in sequential order of delivery destination, wherein the first carriage is concentrically positioned with respect to the second carriage.

18. A system for sorting mail pieces based on destination point, comprising:

a feeder transport system for transporting the mail pieces;

a reader proximate to the feeder transport system for reading destination information associated with the mail pieces;

a cell movement mechanism downstream from the feeder transport system, the cell movement mechanism having a first carriage system and a second carriage system and a plurality of holders slidably positionable between the first carriage system and the second carriage system, the plurality of holders each capturing and holding a mail piece of the mail pieces;

a device for storing the destination information and assigning a code to each of the mail pieces and the plurality of holders based on the destination information of the mail pieces and sorting criteria of the plurality of holders to sort the mail pieces in sequential order of delivery destination; and a thickness measuring device communicating with the device for measuring a thickness of the mail pieces, the destination information and the thickness are used to sort the mail pieces into appropriate bins.

19. A system for sorting mail pieces based on destination point, comprising:

a transport system for transporting the mail pieces;

a character recognition system proximate to the transport system for reading destination information associated with the mail pieces;

a first carriage system;

a second carriage system;

a plurality of holders slidable between the first carriage system and the second carriage system, each of the plurality of holders holding a mail piece of the mail pieces received from the transport system; and a sorting device for assigning a code to:

the mail pieces based on the destination information, the plurality of holders on the first carriage based on an initial sequence of each of the plurality of holders on the first carriage, a position on the second carriage which corresponds to the initial sequence and a destination sequence of the mail pieces, the sorting device instructs movement of the plurality of holders from the first carriage to the second carriage based on the code assigned to the mail pieces, the plurality of holders on the first carriage and the position on the second carriage such that when the mail pieces are moved to the second carriage they are in sequential order of delivery destination; and a thickness measuring device communicating with the sorting device, the sorting device associating a thickness of the mail pieces with the code for the mail pieces, the plurality of holders and the position on the second carriage.

20. A system for sorting mall pieces, comprising:

a transport system for transporting the mail pieces;

a character recognition system for reading destination information associated with the mail pieces;

a carriage system;

a plurality of holders slidable between tracks on the carriage system, each of the plurality of holders holding a mail piece of the mail pieces received from the transport system; and a sorting device communicating with the character recognition system and storing information associated with the mail pieces and assigning a code to:

the mail pieces based on the destination information, the plurality of holders, and a position on one track of the carriage system corresponding to an initial sequence of the plurality of holders and a destination sequence of the mail pieces, wherein the sorting device instructs movement of the plurality of holders between the tracks based on the destination information, the initial sequence and the position on the one track such that when the plurality of holders holding the mail pieces are moved to the one track so-they the mail pieces are provided in sequential order of delivery destination.

21. A system for sorting objects, comprising:

a feeder transport system for transporting the objects;

a reader proximate to the feeder transport system for reading destination information associated with the objects;

a cell movement mechanism downstream from the feeder transport system, the cell movement mechanism having a first carriage system and a second carriage system and a plurality of holders slidably attachable between the first carriage system and the second carriage system, the plurality of holders each capturing and holding an object of the objects; and a sorting device for storing the destination information and assigning a code to each of the objects and the plurality of holders based on the destination information of the objects and sorting criteria of the plurality of holders to sort the objects in sequential order of delivery destination.

22. A system for sorting mail pieces based on destination point, comprising:

a feeder transport system for transporting the mall pieces;

a reader proximate to the feeder transport system for reading destination information associated with the mail pieces;

a cell movement mechanism downstream from the feeder transport system, the cell movement mechanism having a first carriage system and a second carriage system and a plurality of holders transferable between the first carriage system and the second carriage system, the plurality of holders each capturing and holding a mail piece of the mail pieces; and a device for storing the destination information and assigning a code to each of the mail pieces and the plurality of holders based on the destination information of the mail pieces and sorting criteria of the plurality of holders to sort the mail pieces which remain in the plurality of holders in sequential order of delivery destination.

* * * * *